(12) United States Patent
Woodhouse et al.

(10) Patent No.: US 7,322,636 B1
(45) Date of Patent: Jan. 29, 2008

(54) VEHICLE SIDE-ENTRY DOOR ASSEMBLY

(75) Inventors: David Woodhouse, Newport Coast, CA (US); Kris Tomasson, Corona del Mar, CA (US); Jordan Bennett, Ann Arbor, MI (US); Matthew Edwards, Laguna Beach, CA (US)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 11/620,375

(22) Filed: Jan. 5, 2007

(51) Int. Cl.
*B60J 5/04* (2006.01)
(52) U.S. Cl. .................................. 296/147; 296/146.1
(58) Field of Classification Search ................. 296/51, 296/150, 147, 148, 155, 146.8, 146.1; 362/501; 49/366, 367
See application file for complete search history.

(56) References Cited

U.S. PATENT DOCUMENTS

| | | | | |
|---|---|---|---|---|
| 2,249,932 A | * | 7/1941 | Beal | 49/109 |
| 2,538,930 A | * | 1/1951 | Zummach | 292/263 |
| 4,268,084 A | * | 5/1981 | Peters | 296/148 |
| 5,577,793 A | * | 11/1996 | Kobasic | 296/146.4 |
| 6,065,776 A | * | 5/2000 | Toyota et al. | 280/801.1 |
| 6,126,222 A | | 10/2000 | Nguyen et al. | |
| 6,328,374 B1 | | 12/2001 | Patel | |
| 6,763,778 B2 | * | 7/2004 | Bergquist et al. | 116/28 R |
| 6,820,920 B2 | * | 11/2004 | Maeda | 296/146.8 |
| 2004/0145491 A1 | * | 7/2004 | Nascimento | 340/825.72 |
| 2005/0253406 A1 | * | 11/2005 | Faubert et al. | 296/51 |
| 2007/0014122 A1 | * | 1/2007 | Sakiyama et al. | 362/501 |

FOREIGN PATENT DOCUMENTS

| | | | | | |
|---|---|---|---|---|---|
| JP | 401119445 A | * | 5/1989 | | 296/37.1 |
| JP | 401273721 A | * | 11/1989 | | 296/106 |
| JP | 402117417 A | * | 5/1990 | | 296/146.6 |
| JP | 3-118283 A | * | 5/1991 | | |

* cited by examiner

*Primary Examiner*—Jason S Morrow
(74) *Attorney, Agent, or Firm*—Frank A. MacKenzie; Brooks Kushman P.C.

(57) ABSTRACT

A passenger vehicle is provided with a vehicle body, a first door, and a second door. The vehicle body has front and rear ends with a door opening formed through a lateral side of the vehicle body. The door opening allows passenger ingress and egress to and from an interior of the vehicle. The first door is pivotally connected to the vehicle body at an upper region of the door opening for partially enclosing an upper portion of the door opening. The second door is pivotally connected to the vehicle body at a lower region of the door opening for enclosing a lower portion of the door opening. The first and second doors cooperate to collectively enclose the door opening.

18 Claims, 4 Drawing Sheets

VEHICLE SIDE-ENTRY DOOR ASSEMBLY

BACKGROUND OF THE INVENTION

1. Field of the Invention

Various embodiments of the present invention relate to side-entry doors for vehicles.

2. Background Art

Passenger vehicles generally have at least one side-entry door located on either lateral side of the vehicle. Two or more doors may also be provided on one lateral side of the vehicle. These doors allow passenger ingress and egress to and from the vehicle.

Passenger vehicles generally have at least two pillars extending from the body that converge at a roof. Side-entry doors and windows are oriented between adjacent pillars. The pillars are commonly named from front to rear in alphabetical order so that the pillars on either side of a windshield are referred to as A-pillars. The next sequential pillars are referred to as B-pillars.

In vehicles having four side-entry doors, a B-pillar is commonly provided relatively centrally disposed between a front side-entry door and a rear side-entry door. The B-pillar often creates a blind spot for the driver when peering over his shoulder.

In vehicles having two side-entry doors, the side-entry doors are generally longer than those provided in four-door cars of the same or similar model. Longer doors are required to permit ingress and egress for rear seat passengers.

Side-entry doors in vehicles with two or more doors may have hinged connections between the door and the body. These hinged doors may open towards the front end of the vehicles, which is often seen in various types of passenger vehicles. The hinged doors alternatively may open towards a back end of the vehicles which is commonly seen in many vehicles such as sedans, trucks, and vans. The hinged doors opening in either direction may be opened and closed manually or electronically.

Side-entry doors may also open in a sliding manner along the side of the vehicle using a track and guide between the door and the vehicle body. These sliding doors are generally longer than hinged doors to provide more space for ingress and egress to and from multiple rows of seating. Sliding doors are commonly employed in larger vehicles with multiple rows of seating such as minivans and vans. Sliding doors may be opened and closed manually or electronically. Sliding doors often employ safety precautions such as sensors, to help control the opening and closing of the door.

Vehicles may also have a rear opening to the interior of the vehicle, which allows a passenger to place cargo into or remove cargo from the vehicle interior. The rear opening may have an opening cover such as a liftgate or a tailgate. A liftgate typically open upwards toward a roof of the vehicle about a horizontal axis and is commonly seen in minivans and sport utility vehicles. A tailgate typically open downwards toward a floor of the vehicle about a horizontal axis and is commonly seen in trucks.

SUMMARY OF THE INVENTION

In one embodiment of the invention, a passenger vehicle is provided with a vehicle body, a first door, and a second door. The vehicle body has a front end and a rear end with a door opening formed through a lateral side of the vehicle body. The door opening allows passenger ingress and egress to and from an interior of the vehicle. The first door is pivotally connected to the vehicle body at an upper region of the door opening for partially enclosing an upper portion of the door opening. The second door is pivotally connected to the vehicle body at a lower region of the door opening for enclosing a lower portion of the door opening. The second door cooperates with the first door for collectively enclosing the door opening.

In another embodiment, a passenger vehicle is provided with a vehicle body, a first door, and a second door. The vehicle body has a front end and a rear end with a door opening formed through a lateral side of the vehicle body. The door opening allows passenger ingress and egress to and from an interior of the vehicle. The first door is pivotally connected to the vehicle body along a first generally horizontal axis of the door opening for partially enclosing an upper portion of the door opening. The second door is pivotally connected to the vehicle body along a second generally horizontal axis of the door opening for enclosing a lower portion of the door opening. The second door cooperates with the first door for collectively enclosing the door opening.

In yet another embodiment, a passenger vehicle is provided with a vehicle body, a first door, and a second door. The vehicle body has an A-pillar extending upward from the vehicle body on a lateral side of the vehicle body, a side member extending along a lower portion of the lateral side of the vehicle body, a roof member extending along an upper portion of the lateral side of the vehicle body, and a B-pillar extending upward from the side member to the roof member. A door opening is formed between the A-pillar, the side member, the roof member, and the B-pillar. The door opening allows passenger ingress and egress to and from an interior of the vehicle. The first door is pivotally connected to the vehicle body at the roof member along a first generally horizontal axis for partially enclosing an upper portion of the door opening. The second door is pivotally connected to the vehicle body at the side member along a second generally horizontal axis of the door opening for enclosing a lower portion of the door opening. The second door cooperates with the first door for collectively enclosing the door opening.

The above embodiments, and other embodiments, objects, features, and advantages of the present invention are readily apparent from the following detailed description of embodiments of the invention when taken in connection with the accompanying drawings.

DETAILED DESCRIPTION OF EMBODIMENTS OF THE INVENTION

As required, detailed embodiments of the present invention are disclosed herein; however, it is to be understood that the disclosed embodiments are merely exemplary of the invention that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for the claims and/or as a representative basis for teaching one skilled in the art to variously employ the present invention.

Figure 1:
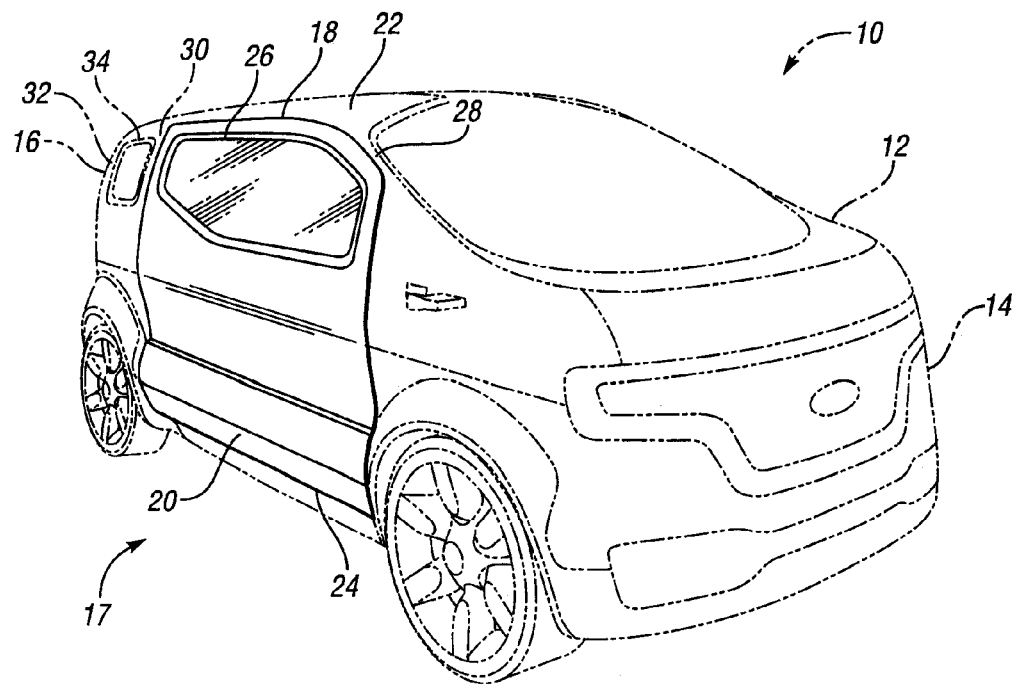
FIG. 1 is a perspective view of a first embodiment of a vehicle having a side-entry door assembly illustrated in a closed orientation.

Referring to FIG. 1, a passenger vehicle is illustrated and referenced generally by numeral 10. The passenger vehicle 10 has a vehicle body 12, which provides the body structure for the vehicle 10. The vehicle body 12 defines an interior 36 for housing passengers within the vehicle 10. The interior 36 may have a first seating row, a second seating row, and a third seating row, or any suitable amount of seating rows for transporting passengers.

An exterior portion of the vehicle body 12 has a front end 14 and a rear end 16. The front end 14 is toward the forward direction of travel of the vehicle 10 and the rear end 16 is toward the rearward direction of travel of the vehicle 10. Any size or shape for the front end 14 and the rear end 16 is contemplated within the scope of the present invention.

Between the front end 14 and the rear end 16 is a first lateral side 17 of the vehicle body 12. The vehicle body 12 has a second lateral side provided opposite the first lateral side 17. In one embodiment, the first lateral side 17 is the passenger side, which passengers access the interior 36. In another embodiment, the first lateral side 17 is the driver side, which a driver and/or passengers may access the interior 36.

On the first lateral side 17, a door assembly is oriented to allow passenger ingress and egress to and from the interior 36. The door assembly includes an upper door 18 mounted on the vehicle body 12 at a roof region 22 of the vehicle body 12. The upper door 18 is pivotally mounted to the roof region 22 through the use of hinges, for example. The upper door 18 may be pivotally mounted to the roof region 22 in any suitable manner contemplated within the scope of the present invention. In another embodiment, the upper door 18 includes safety precautions, such as sensors or locking support rods, to help control the pivotal movement of the upper door 18.

The door assembly has a lower door 20 mounted to a floor region 24 of the vehicle body 12, as illustrated. The lower door 20 may be pivotally mounted to the floor region 24 through the use of hinges. Any suitable manner of pivotally mounting the lower door 20 to the floor region 24 is contemplated within the scope of the present invention. In another embodiment, the lower door 20 includes safety precautions, such as sensors or locking support rods, to help control the pivotal movement of the lower door 20.

In one embodiment, the upper door 18 has a window opening 26 formed through the upper door 18 to receive a window. Any suitable size or shape of the window opening 26 is contemplated within the scope of the present invention so that a window may be installed therein. In another embodiment, the upper door 18 may have multiple window openings 26 provided therethrough to receive multiple windows. In yet another embodiment, the upper door 18 may have no window openings provided therethrough so that the upper door 18 has no windows. In yet another embodiment, the lower door 20 may be provided with at least one window opening 26 to receive at least one window therein.

The upper door 18 and the lower door 20 may each contact on an A-pillar 28 on a first lateral side of each of the upper door 18 and the lower door 20. The A-pillar 28 may extend fully or partially between the roof region 22 of the vehicle 10 and the floor region 24 of the vehicle body 12.

The upper door 18 and the lower door 20 may each contact a B-pillar 30 on a second lateral side of each of the upper door 18 and the lower door 20. The B-pillar 30 may extend fully or partially between the roof region 22 of the vehicle 10 and the floor region 24 of the vehicle body 12.

The vehicle body 12 may have a C-pillar 32. An opening 34 is defined between the B-pillar 30 and the C-pillar 32. The opening 34 may receive a daylight window therein to allow light to pass into the interior 36. In another embodiment, the opening 34 may receive a door assembly. Thus, any size or shape for the opening 34 is contemplated within the scope of the present invention.

Figure 2:
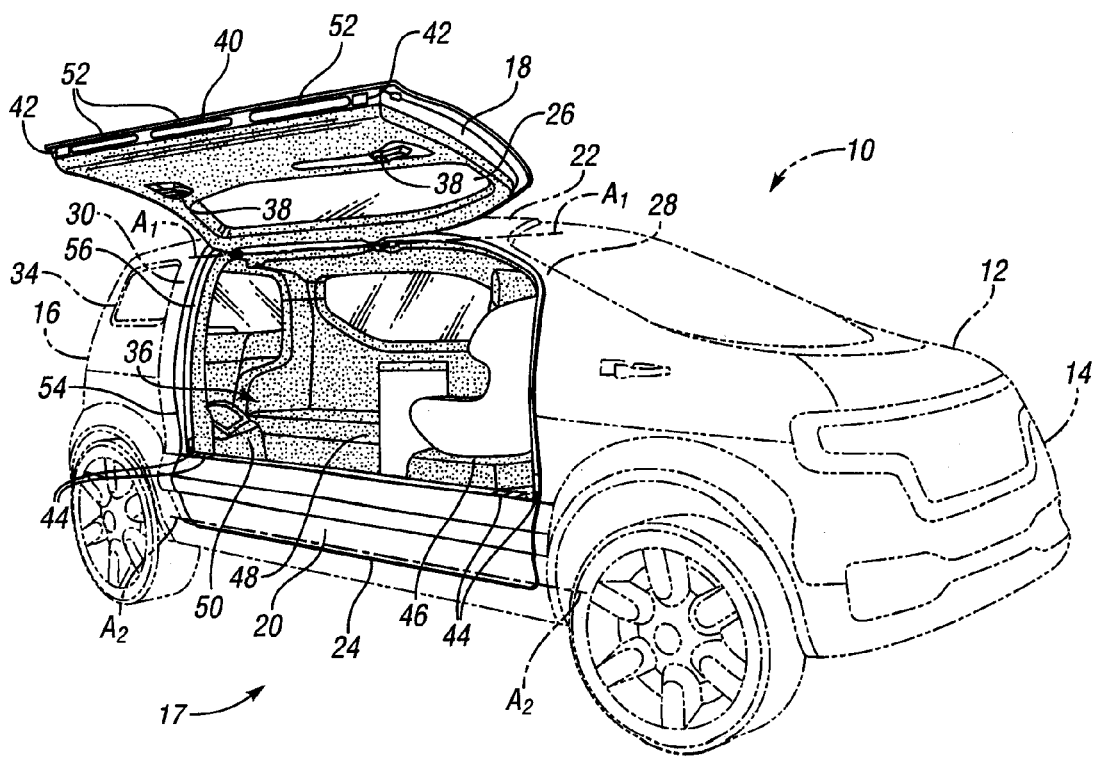
FIG. 2 is another perspective view of the vehicle of FIG. 1 illustrated with the side-entry door assembly in an intermediate opened orientation.

Referring now to FIG. 2, the vehicle 10 of FIG. 1 is illustrated with the upper door 18 in an opened position and the lower door 20 in a closed position to define an intermediate opened orientation. In the intermediate opened orientation, the interior 36 is accessible since the upper door 18 is in an opened position. To be oriented in the opened position from the closed position, the upper door 18 has pivoted about the first longitudinal axis $A_1$. The lower door 20 is in a closed position since the lower door 20 has not pivoted about the second longitudinal axis $A_2$.

In this intermediate opened orientation, a passenger may load cargo into the interior 36 by lifting the cargo above the lower door 20 through the upper portion 56 of the door opening 54, and placing the cargo in the interior 36. A passenger may also unload cargo from the interior 36 by lifting the cargo out of the interior 36 through the upper portion 56 of the door opening 54. The lower door 20 may provide support for the cargo while a passenger is loading or unloading cargo.

The upper door 18 may have a lip 40 with any suitable thickness on a peripheral edge of the upper door 18 between an exterior and interior of the upper door 18. The lip 40 may be visible when the upper door 18 is in the opened position.

In one embodiment, a door handle 38 releases the upper door 18 to allow pivotal motion of the upper door 18. The upper door 18 may pivot from the closed position to the opened position or from the opened to the closed position. In another embodiment, the door handle 38 releases the lower door 20 to allow pivotal motion of the lower door 20. The door handle 38 may be provided on an interior region of the upper or lower doors 18, 20 or on an exterior region of the upper or lower doors 18, 20.

The door handle 38 may interact with the latch mechanism having a latch 42 and a striker 44. The latch 42 may be provided on the lip 40 of the upper door 20 and the striker 44 may be correspondingly provided on the lower door 20 or on the door opening 54. Any suitable latch mechanism is contemplated within the scope of the present invention.

The upper door 18 may have a light source 52 to light the interior 36 of the vehicle 10 or an exterior environment outside of the interior 36. In one embodiment, the light source 52 is on the lip 40 of the upper door 18. Any suitable light source 52 is contemplated within the scope of the present invention. In one embodiment, the light source 52 is an array of light emitting diodes (LEDs). In another embodiment, the light source 52 scrolls letters, words, numbers, or a combination thereof across a display of the light source 52.

When the upper door 18 is in the opened position as illustrated, the upper door 18 serves as a canopy for a passenger by extending beyond the vehicle body 12. The extension of the upper door 18 covers an area outside of the vehicle body 12. When a passenger is in the area outside of the vehicle body 12 under the upper door 18, the canopy provides overhead covering for the passenger from the weather or conditions outside of the vehicle 10, for example by providing shade from the sun or protection from precipitation.

Figure 3:
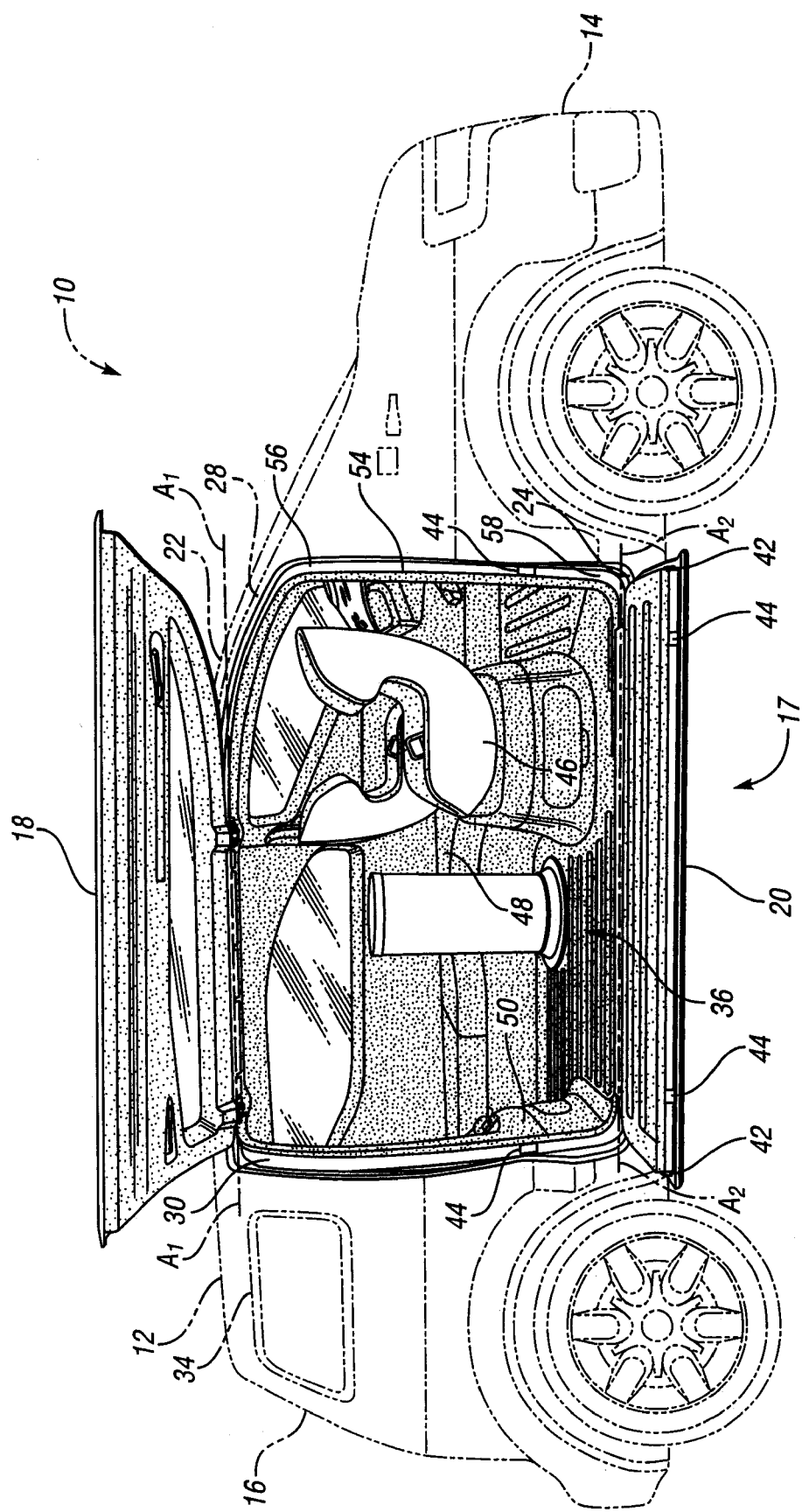
FIG. 3 is a side perspective view of the vehicle of FIG. 1 illustrated with the side-entry door assembly in a fully opened orientation.
Figure 4:
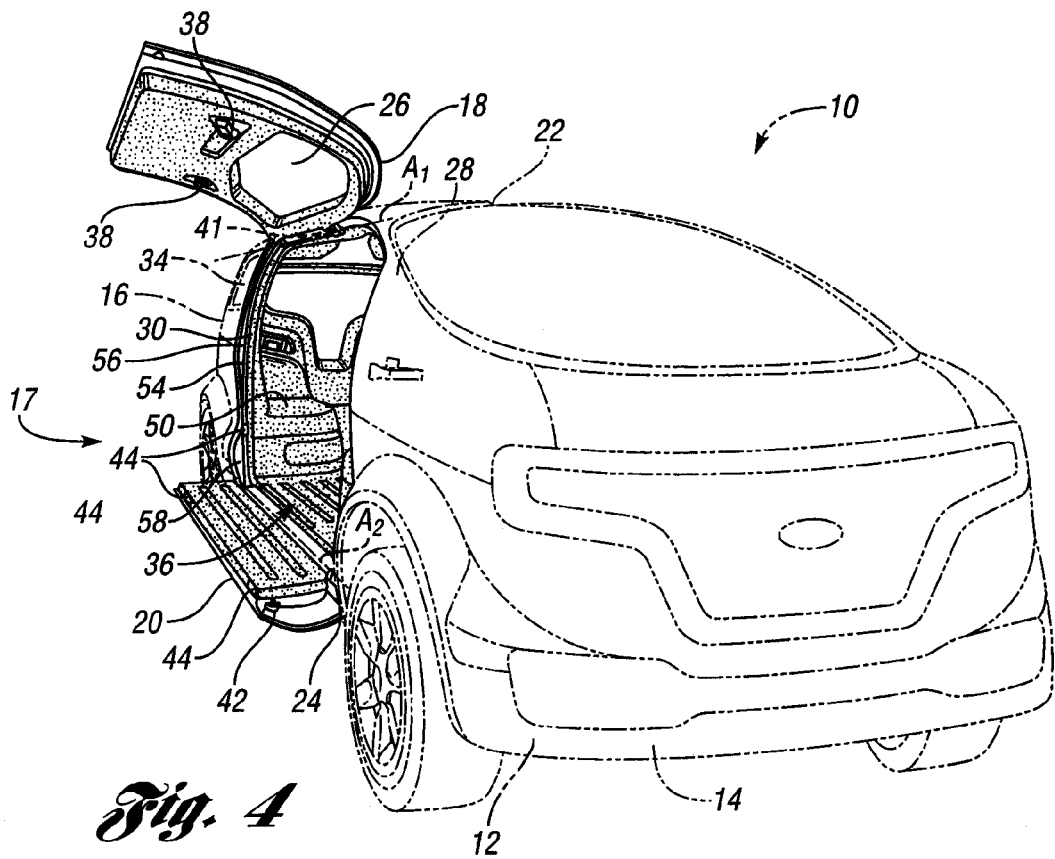
FIG. 4 is a front perspective view of the vehicle of FIG. 1 illustrated with the side door assembly in a fully opened orientation.

Referring now to FIGS. 3 and 4, the vehicle 10 of FIG. 1 is illustrated with the door assembly of the upper door 18 and the lower door 20 in a fully opened orientation with the upper door 18 in the opened position and the lower door 20 in the opened position. The upper door 18 has pivoted about the first longitudinal axis $A_1$ to be in the opened position and the lower door 20 has pivoted about a second longitudinal axis $A_2$ to be in the opened position. The opened positions of the upper and lower doors 18, 20 collectively define the fully opened orientation.

In the fully opened orientation, passenger ingress and egress is easily facilitated to a first row of seating 46, a second row of seating 48, and/or a third row of seating 50. The door opening 54 may be aligned with the first row 46 so that a passenger may easily have access to the first row of seating 46 and the second row 48. The door opening 54 may be aligned with the first row 46 and the second row 48 to provide a passenger access to the first row 46, the second row 48, and the third row 50. Any alignment of the door opening 54 is contemplated within the scope of the present invention. In another embodiment, a second door opening 54 is formed through the vehicle body 12. Any number of door openings 54 is contemplated so that at least one row of seating is accessed through a common door on the lateral side 17 of the vehicle 10.

In the fully opened orientation illustrated, the upper door 18 provides a canopy for a passenger by extending beyond the vehicle body 12 to cover an outside area. In another embodiment, the upper door 18 extends beyond the lower door 20 in the opened position to provide the canopy so that the lower door 20 and an outside area are covered by the canopy.

In one embodiment, the lower door 20 in the opened position serves as a step for passengers to facilitate ingress and egress to and from the interior 36 because the upper door 18 is sized to cover a substantial portion 56 of the door opening 54 and the lower door 20 is sized to cover a smaller portion 58 of the door opening 54. The substantial portion 56 may be a majority of the door opening 54. The step may also support a load to allow a passenger load cargo into or unload cargo from the interior 36 by placing the cargo on the step through the lower portion 58 of the door opening 54 and moving the cargo onto or off of the step.

Figure 5:
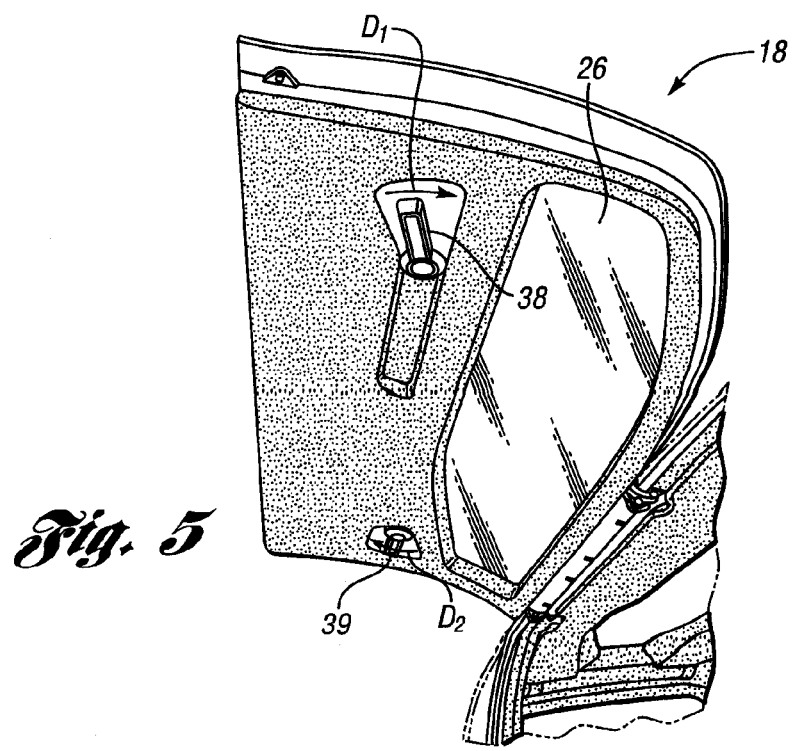
FIG. 5 is an interior perspective view of a part of the door assembly of FIG. 1.

Referring now to FIG. 5, an upper door 18 is illustrated in an opened orientation. The upper door 18 may have a first door handle 38 and a second door handle 39. The first door handle 38 and second door handle 39 may interact with a latch mechanism to open the upper door 18 from a closed position to the open position illustrated. The first handle 38 may rotate in a first rotary direction $D_1$ to release a latch mechanism. The second door handle 39 may rotate in a second rotary direction $D_2$ to release a latch mechanism. The second rotary direction $D_2$ may be counter or opposite to the first rotary direction $D_1$. Any suitable door handle 38 or 39 is contemplated within the scope of the present invention.

Figure 6:
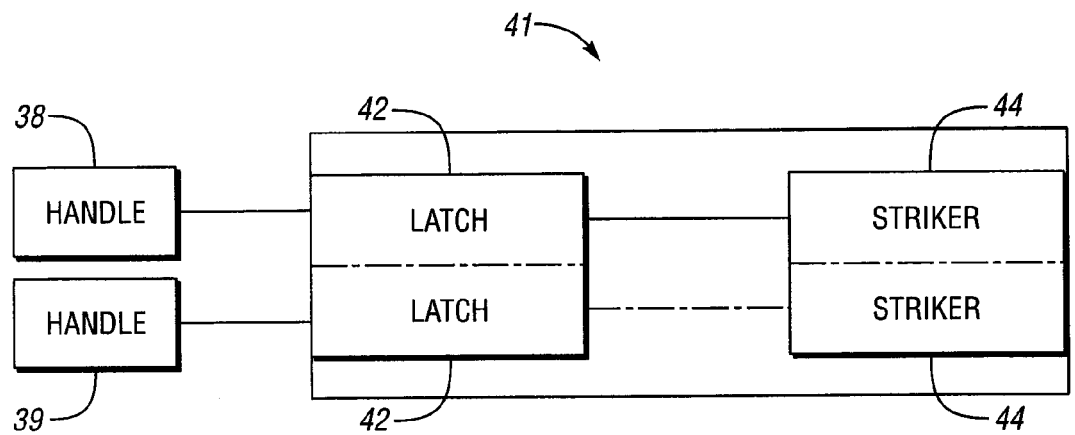
FIG. 6 is a schematic view of one embodiment of a release mechanism for the side-entry door assembly of FIG. 1.

Referring now to FIG. 6, a schematic view of the first handle 38 and the second handle 39 interacting with a latch mechanism 41 is illustrated. The latch mechanism 41 may have a latch 42 which is operatively connected with a striker 44. In one embodiment, the first handle 38 interacts with two latches 42. The two latches 42 interact with two strikers 44. In another embodiment, the second handle 39 interacts with two latches 42 which in turn interact with two strikers 44. In yet another embodiment, the first handle 38 and the second handle 39 interact with the latch mechanism 41. Any suitable latch mechanism 41 is contemplated within the scope of the present invention. In addition, the first handle 38 and the second handle 39 may mechanically or electronically interact with the latch mechanism 41. The handles 38, 39 and the latch assembly 41 may be used in an upper door or a lower door.

Figure 7:
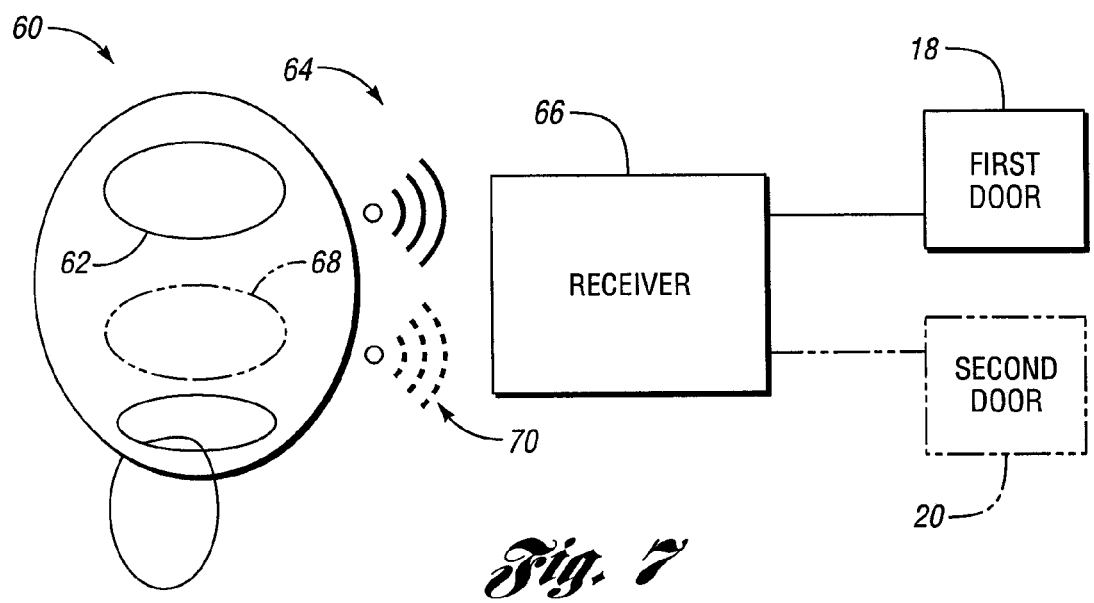
FIG. 7 is a schematic view another release mechanism embodiment for the side-entry door assembly of FIG. 1.

Referring now to FIG. 7, a transmitter 60 is illustrated in wireless communication with a receiver 66. The transmitter 60 is separate and portable from the vehicle illustrated in FIG. 1 so that a driver or passenger may carry the transmitter 60 and activate the transmitter 60 outside of the vehicle. The receiver 66 may be provided in any suitable location of the vehicle of FIG. 1.

The transmitter 60 may have a first button 62 to wirelessly activate transmittal of a first signal 64 to the receiver 66. The receiver 66 may be in operative connection with the upper door 18 to release the upper door 18 from the closed position illustrated in FIG. 1 so that the upper door 18 pivots to the opened position illustrated in FIG. 2. Once the upper door 18 is released from the closed position, the upper door 18 may be manually, automatically, or mechanically pivoted to the opened position. In another embodiment, the upper door 18 may be driven or use automation to pivot from the closed position to the opened position.

In another embodiment depicted in FIG. 7, the transmitter 60 has a second button 68 to wirelessly activate transmittal of a second signal 70 to the receiver 66. The second signal 70 prompts the receiver 66 to open the lower door 20 from the closed position illustrated in FIG. 2 to the opened position illustrated in FIG. 3. Any suitable transmitter 60 and receiver 66 is contemplated within the scope of the present invention. Once the lower door 20 is released from the closed position, the lower door 20 may be manually, automatically, or mechanically pivoted to the opened position. In another embodiment, the lower door 20 may be driven or use automation to pivot from the closed position to the opened position.

While embodiments of the invention have been illustrated and described, it is not intended that these embodiments illustrate and describe all possible forms of the invention. Rather, the words used in the specification are words of description rather than limitation, and it is understood that various changes may be made without departing from the spirit and scope of the invention.

What is claimed is:

1. A passenger vehicle comprising:
    a vehicle body having an A-pillar extending upward from the vehicle body on a lateral side of the vehicle body, a side member extending along a lower portion of the lateral side of the vehicle body, a roof member extending along an upper portion of the lateral side of the vehicle body, and a B-pillar extending upward from the side member to the roof member such that a door opening is formed between the A-pillar, the side member, the roof member, and the B-pillar, the door opening allowing passenger ingress and egress to and from an interior of the vehicle;

a first door pivotally connected to the vehicle body at the roof member along a first generally horizontal axis for partially enclosing an upper portion of the door opening; and a second door pivotally connected to the vehicle body at the side member along a second generally horizontal axis of the door opening for enclosing a lower portion of the door opening, the second door cooperating with the first door for collectively enclosing the door opening.

2. The vehicle of claim 1 wherein a window opening is formed through the first door and wherein the first door further comprises a window mounted within the window opening.

3. The vehicle of claim 1 further comprising a latch mechanism mounted to the second door and cooperating with the vehicle body to release the second door from a closed position to an opened position.

4. The vehicle of claim 1 wherein the first door further comprises:
a lip portion provided on a lower peripheral edge of the first door between an interior portion and an exterior portion of the first door; and
a light source provided on the lip portion.

5. The vehicle of claim 1 further comprising:
a portable transmitter to convey a first signal when actuated; and
a receiver provided in the vehicle body to receive the first signal of the transmitter, the receiver being operatively connected to the first door to unlatch the first door upon receipt of the first signal.

6. The vehicle of claim 5 wherein the transmitter when actuated conveys a second signal to the receiver and the receiver is operatively connected to the second door to unlatch the second door.

7. The vehicle of claim 1 wherein the first door further comprises:
a latch mechanism mounted in the first door for latching the first door to the vehicle body;
a first interior door handle provided on an interior portion of the first door, the first interior door handle being operatively connected to the latch mechanism; and
a second interior door handle provided on an interior portion of the first door spaced apart from the first interior door handle, the second interior door handle being operatively connected to the latch mechanism;
whereby manual actuation of one of the first interior door handle and the second interior door handle releases the latch mechanism so that an occupant can open the first door.

8. The vehicle of claim 7 wherein the first interior door handle rotates in a first rotary direction and the second interior door handle rotates in a second direction that is opposite to the first rotary direction.

9. The vehicle of claim 1 wherein the first door pivots about a first pivotal axis between a first door closed position and a first door opened position, and the second door pivots about a second pivotal axis between a second door closed position and a second door opened position.

10. The vehicle of claim 9 wherein a fully open orientation of first and second doors is defined when the first door is in the first door opened position and the second door is in the second door opened position such that the second door provides a step to assist passenger ingress and egress to and from the interior.

11. The vehicle of claim 9 wherein a fully open orientation of first and second doors is defined when the first door is in the first door opened position and the second door is in the second door opened position such that the first door provides a canopy extending laterally beyond the second door.

12. The vehicle of claim 9 wherein a partially open orientation of first and second doors is defined when the first door is in the first door opened position and the second door is in the second door closed position.

13. The vehicle of claim 12 wherein the first door in the partially open orientation provides a canopy extending laterally beyond the vehicle body.

14. The vehicle of claim 9 wherein the door opening is aligned with a first row of passenger seating.

15. The vehicle of claim 14 wherein the door opening permits ingress and egress to and from a second row of passenger seating.

16. The vehicle of claim 9 wherein the door opening is aligned with a first row and a second row of passenger seating to permit ingress and egress to and from the first row and the second row of passenger seating.

17. The vehicle of claim 16 wherein the door opening permits ingress and egress to and from a third row of passenger seating.

18. The vehicle of claim 1 wherein the vehicle body further comprises a C-pillar extending upward from the side member to the roof member such that an opening is formed between the B-pillar, the C-pillar, the side member, and the roof member.

* * * * *